United States Patent [19]
Reniers et al.

[11] Patent Number: 5,989,152
[45] Date of Patent: Nov. 23, 1999

[54] METHOD FOR REGULATING CLUTCH PRESSURE IN TRANSMISSION UNIT USING PITOT PRESSURES AND TRANSMISSION UNIT APPLYING SUCH METHOD

[75] Inventors: Dirk Louis Reniers, Genk; Gerrit-Jan Vogelaar, Hasselt; Stijn Marie Alfred Helsen, Haacht, all of Belgium

[73] Assignee: VCST, naamloze vennootschap., Sint-Truiden, Belgium

[21] Appl. No.: 08/985,174

[22] Filed: Dec. 4, 1997

[30] Foreign Application Priority Data

Dec. 17, 1996 [BE] Belgium ................ 09601051

[51] Int. Cl.⁶ ............... F16H 61/00; B60K 41/22
[52] U.S. Cl. .............. 477/45; 477/175; 477/44; 477/46; 474/1
[58] Field of Search ................ 477/39, 44, 45, 477/70, 79, 86, 174, 175; 474/1; 475/209–211

[56] References Cited

U.S. PATENT DOCUMENTS

| | | | |
|---|---|---|---|
| 3,862,676 | 1/1975 | Schall | 477/175 |
| 4,579,021 | 4/1986 | Yamamuro et al. | 477/45 |
| 4,592,457 | 6/1986 | Cadee | 477/175 X |
| 5,665,023 | 9/1997 | Aoki et al. | 477/48 |

FOREIGN PATENT DOCUMENTS

| | | |
|---|---|---|
| 0 487 128 | 5/1992 | European Pat. Off. . |
| 2 134 196 | 8/1984 | United Kingdom . |

*Primary Examiner*—Rodney H. Bonck
*Assistant Examiner*—Ankur Parekh
*Attorney, Agent, or Firm*—Bacon & Thomas PLLC

[57] ABSTRACT

A method for regulating a belt variator type transmission unit for motor vehicles, and which includes a belt variator, a reversing unit and a hydraulically controlled engine drive coupling that controls the reversing unit to provide forward and reverse drive connection between the engine and variator. The drive coupling comprises a forward coupling and a reverse coupling including fluid driven clutches which may be operated via a pressure regulating unit that provides an adjustable clutch actuating pressure. The clutch actuating pressure is hydraulically regulated both as a function of engine Pitot pressure which is representative of the engine speed, and as a function of a regulated pressure which is set by an electronically controlled valve.

19 Claims, 1 Drawing Sheet

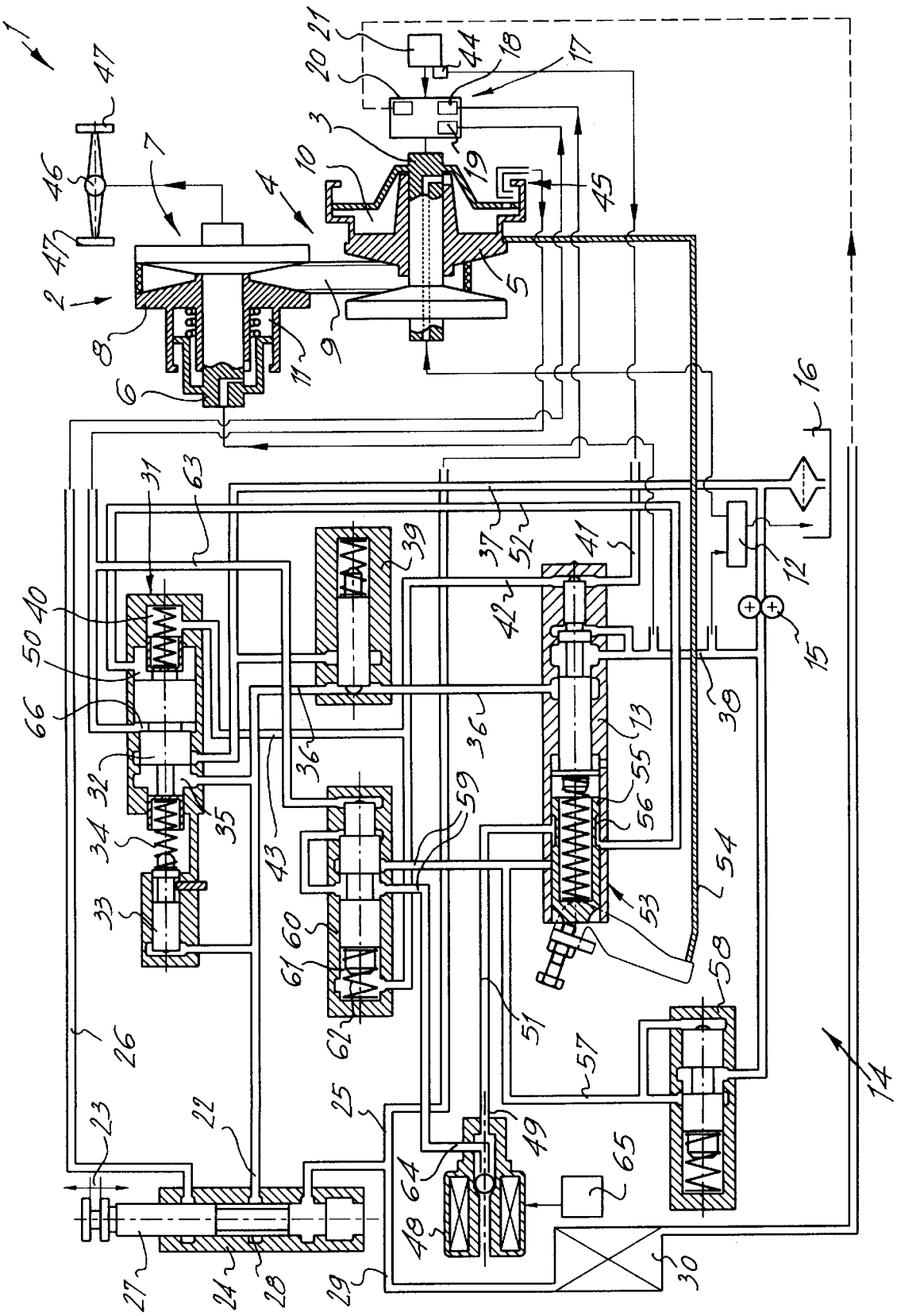

METHOD FOR REGULATING CLUTCH PRESSURE IN TRANSMISSION UNIT USING PITOT PRESSURES AND TRANSMISSION UNIT APPLYING SUCH METHOD

BACKGROUND OF THE INVENTION

1. Field of the Invention

The present invention concerns a method for regulating a transmission unit for motor vehicles, as well as a transmission unit applying such a method.

In particular, the invention concerns a method for regulating clutch pressures of an engine drive coupling in transmission units which are provided with a belt variator.

2. Description of the Related Art

As is known, such a belt variator comprises: a primary pulley placed on an input shaft; a secondary pulley placed on a driven or output shaft; and an endless transmission element provided between both pulleys. Each pulley is formed of two conical pulley halves which may be moved in relation to one another such that the transmission ratio may be altered by pulling the pulley halves more or less apart. The mutual position of the pulley halves is set as a function of various data by hydraulic pressure cylinders which are controlled by regulating means.

The belt variator is coupled to the motor of a motor vehicle via a drive coupling including a reversing unit. The belt variator is connected to the wheels of the vehicle by the driven shaft, such that, by the drive coupling, which includes a forward clutch coupling and a reverse clutch coupling, either a driving connection between the motor and the belt variator may be broken, a connection may be made in the forward driving direction, or a connection may be made in the reverse driving direction.

The forward coupling and the reverse coupling comprise flexible disc clutch couplings which are driven or actuated by fluid pressure. The control of the clutches may be carried out according to known embodiments in a hydraulic or electronic manner.

With the known hydraulically controlled transmission units, the drive coupling is controlled by a clutch pressure which is mainly determined by the engine speed. This may be done via an engine Pitot pressure which, as is known, depends quadratically on the engine speed.

With known entirely electronically controlled transmission units, the clutch pressure is set as a function of various parameters which are processed in an electronic manner. To this end, rather expensive electronic hardware is required. Moreover, a hydraulic backup system must be provided which assumes a minimal number of functions in case the electronics fail. Thus, the hydraulic control unit is still very complex even though the control is carried out electronically.

SUMMARY OF THE INVENTION

This present invention aims to provide a method and transmission unit whereby the two above-mentioned systems are combined such that, with a relatively simple hydraulic control unit and relatively simple electronic hardware, the clutch pressure may be set as a function of a large number of parameters, including the engine speed, the clutch slip, the throttle position, the speed of the vehicle, etc.

To this aim, the invention provides a method for regulating a transmission unit for motor vehicles, in particular a transmission unit which makes use of a belt variator, a reversing unit and a hydraulically controlled drive coupling.

The drive coupling comprises a forward coupling and a reverse coupling which are clutches operated fluidically by a pressure regulating unit with an adjustable clutch pressure. The clutch pressure is regulated as a function of a Pitot pressure which is representative of the engine speed, namely the engine Pitot pressure, and as a function of a regulated pressure which is set by an electronically controlled valve.

Preferably, the clutch pressure is controlled as a function of the engine Pitot pressure so that an increase of the engine Pitot pressure and an increase of the pressure supplied by the electronically controlled valve result in an increase of the clutch pressure.

According to a special characteristic of the invention, the regulation by the electronically controlled valve is preferably maintained until the belt variator is geared up into a predetermined transmission speed ratio, and after this transmission speed ratio has been reached, the above-mentioned regulated pressure is replaced by a constant pressure which is sufficiently high to close the desired coupling. Thus, slip on the desired coupling is excluded as soon as a certain transmission speed ratio is reached, without any electronics being required to that end.

According to a variant, the clutch pressure is also regulated as a function of a Pitot pressure which is representative of the primary rotational speed, in other words the rotational speed of the input shaft of the belt variator. The clutch pressure is regulated as a function of such a Pitot pressure, called the primary Pitot pressure, such that an increase of the primary Pitot pressure results in a decrease of the clutch pressure. Consequently, in a hydraulic way, the clutch pressure will depend on the primary rotational speed, and thus on the clutch slip, so that the electronic regulation may be made simpler.

According to a preferred embodiment, the pressure which is supplied by the above-mentioned electronically controlled valve is hydraulically adjusted as a function of at least one Pitot pressure, either a Pitot pressure which is representative of the engine speed, namely the engine Pitot pressure, or a Pitot pressure which is representative of the rotational speed at the input shaft of the belt variator, namely the primary Pitot pressure.

According to another preferred embodiment, this adjustment is carried out by adjusting the pressure supplied to the electronically controlled valve as a function of one or both of the above-mentioned Pitot pressures, whereby for one and the same control of the electronically controlled valve, the supplied pressure is made to increase when the engine Pitot pressure increases and/or is made to decrease when the primary Pitot pressure increases.

According to the most preferred embodiment, the adjustment is carried out both as a function of the engine Pitot pressure and as a function of the primary Pitot pressure.

BRIEF DESCRIPTION OF THE DRAWING

In order to better explain the characteristics of the invention, the following preferred embodiments of a transmission unit applying the method according to the invention are described, as examples only without being limitative in any way, with reference to the sole accompanying drawing, which is a schematic representation of a transmission system.

DETAILED DESCRIPTION OF THE PREFERRED EMBODIMENTS

As is represented in the FIGURE, the invention concerns a transmission unit 1 which makes use of a belt variator 2.

As is known, the belt variator 2 comprises: a primary pulley 4 connected to an input shaft 3 and having at least one pulley half 5 which may be axially moved; a secondary pulley 7 connected to an output or a driven shaft 6 and having at least one pulley half 8 which may be axially moved; and an endless transmission element 9, such as a belt, provided between pulleys 4 and 7, such that the transmission ratio between shafts 3 and 6 may be altered by axially moving pulley halves 5 and 8.

Pulley halves 5 and 8 are moved by hydraulic pressure cylinders working in conjunction therewith. The hydraulic pressure cylinders include a primary pressure cylinder 10 and a secondary pressure cylinder 11, whose pressures are regulated by a primary regulating valve 12 and a secondary regulating vale 13, respectively, which are part of a hydraulic control unit 14 which is fed in a known manner with a hydraulic medium under pressure which is pumped up from a reservoir 16 by a pump 15.

Input shaft 3 is usually driven by a motor 21 of the motor vehicle concerned via drive coupling unit 17, which comprises a forward coupling 18 and a reverse coupling 19, and via a reversing unit 20. Reversing unit 20 usually comprises a planetary transmission of which certain parts may be alternately locked by forward clutch coupling 18 and reverse clutch coupling 19 such that driven shaft 6 may be driven, depending on whether coupling 18 or 19 is engaged, in the same sense of rotation or the opposite sense of rotation of the shaft of motor 21.

Forward coupling 18 and reverse coupling 19 comprise hydraulically driven multi-plate clutches which may be engaged via pressure cylinders working in conjunction therewith.

Coupling 18 or 19 is engaged by supplying medium under pressure to it via a coupling supply pipe 22 and a switch valve 24, which may be operated by a gear lever 23 of the motor vehicle, such that, by switching switch valve 24, either the pressure from coupling supply pipe 22 will be supplied to forward coupling 18 via a forward coupling supply pipe 25, or to reverse coupling 19 via a reverse coupling supply pipe 26, or both couplings 18-19 will be maintained pressureless.

To this aim, switch valve 24 is provided with a switch valve piston or spool 27 cooperating with a switch valve chamber 28 which, following the movement of valve piston 27 either makes no connection at all between pipes 22-25-26, makes a connection between pipes 22-25 or makes a connection between pipes 22-26.

Forward coupling supply pipe 25 may be provided with a branch 29 which, by a cooler device 30, cools forward coupling 18 when it is activated.

The pressure in coupling supply pipe 22 and in the desired coupling 18 or 19 is regulated by a pressure regulating unit including a pressure regulating valve 31. As is represented in the example of the accompanying FIGURE, pressure regulating valve 31 usually has two regulating servo valves including regulating valve pistons 32-33 which are positioned in relation to one another by a regulating valve spring 34. In order to regulate the pressure in coupling supply pipe 22, the latter is connected to regulating valve chamber 35 associated with regulating valve piston 32. Regulating valve chamber 35 is fed with medium under pressure via a regulating valve pipe 36. When regulating valve piston 32 moves, fluid may be bled from regulating valve chamber 35, via a bleed pipe 37, so that the pressure in regulating valve chamber 35, and consequently also the pressure in coupling supply pipe 22, may be regulated or adjusted.

As is represented in the FIGURE, regulating valve pipe 36 may be fed with the medium which is discharged from secondary regulating valve 13. Secondary regulating valve 13 is fed in turn via a secondary regulating valve pipe 38 from pump 15.

An underpressure valve 39 is preferably provided in regulating valve pipe 36, as is represented.

Regulating valve 31 is loaded by the engine Pitot pressure via a loading chamber 40, in this case via a plurality of loading pipes 41-42-43. To this end, the whole is provided with an engine Pitot unit 44 with which the engine Pitot pressure is determined. The engine Pitot pressure, as is known, is a pressure that is representative of the rotational speed of the shaft of motor 21.

Further, the whole is provided with a primary Pitot unit 45 with which the primary Pitot pressure is determined, i.e., a pressure which is representative of the rotational speed of input shaft 3.

Both Pitot pressures form control pressures which, as will be described hereafter, are used for the control.

It is clear that the movement of driven shaft 6 is transferred to a number of wheels 47 of the motor vehicle via a differential 46 or the like.

The invention is unique in that the pressure regulating unit, in particular pressure regulating valve 31, is connected to engine Pitot unit 44 as well as to an electronically controlled valve 48 and in that pressure regulating valve 31 is controlled as a function of both the engine Pitot pressure and a regulated pressure which is set by electronically controlled valve 48.

The connection to engine Pitot unit 44 comprises loading pipes 41-42-43 which lead into loading chamber 40 so that a pressure opposite to regulating valve spring 34 is exerted. An outlet 49 of the electronically controlled valve 48 is also connected to a servo regulating valve auxiliary chamber 50 provided on regulating valve disc 32 so that another pressure opposite to regulating valve spring 34 is exerted on regulating valve disc 32. This connection is formed by a set of connection pipes 51-52.

As is represented in the FIGURE, a connection valve 53 is preferably provided in the connection which ensures that the regulation by electronically controlled valve 48 is maintained until belt variator 2 is geared up into a predetermined transmission ratio, and that, after this transmission ratio has been reached, the above-mentioned regulated pressure is replaced by a constant pressure which ensures that the desired coupling 18-19 is at all times engaged. Connection valve 53 preferably works in conjunction with primary pulley 4 of belt variator 2 by, for example, a feeler unit which is schematically represented in the accompanying drawing by a mechanical link 54 between moveable primary pulley half 5 and a connection valve spool 55 of connection valve 53.

As represented, connection valve 53 may be part of secondary regulating valve 13 which, as is known, is usually already equipped with a feeler unit which has the same function, so that no separate feeler unit, nor a separate valve disc need be provided.

In order to realize the above-mentioned change-over between a regulated and a constant pressure, connection valve spool 55 is equipped with a port 56 which, in the position represented in the FIGURE, makes a connection between connection pipes 51 and 52, but which, as a result of the movement of connection valve spool 55 to the left, interrupts the connection between connection pipes 51 and 52 when in a certain position, and which connects connection pipe 52 to a constant pressure pipe 57 in which a constant pressure prevails. This constant pressure is regulated by a constant pressure valve 58.

Constant pressure valve 58 also feeds electronically controlled valve 48 via constant pressure pipes 57-59.

As represented, a feed valve 60 is preferably, but not necessarily, provided in constant pressure pipe 59 with a feed valve piston 61 which is loaded in one direction by a feed valve spring 62 and a pressure supplied by engine Pitot unit 44, and which is loaded in the other direction by the pressure supplied by the feed valve and the primary Pitot pressure supplied via a load pressure supply pipe 63. As a result, the pressure on an inlet 64 of electronically controlled valve 48, and consequently also on electronically controlled valve outlet 49, depending on both the primary Pitot pressure and the engine Pitot pressure, is controlled so that a hydraulic adjustment is obtained as mentioned above.

Electronically controlled valve 48 preferably comprises a pulse-modulated passage valve which is controlled by a control unit 65.

As represented in the accompanying drawing, the clutch pressure is preferably also regulated in a hydraulic manner as a function of the primary Pitot pressure. To this end, pressure regulating valve 31 is provided with a regulating valve auxiliary chamber 66 which is connected to primary Pitot unit 45, where by the pressure exerted in auxiliary chamber 66 delivers a force opposite to the force exerted on regulating valve piston 32 by the engine Pitot pressure.

It is clear that several variants are possible and that the connection of the primary Pitot pressure to pressure regulating valve 31 and the insertion of feed valve 60 in the feeder of electronically controlled valve 48 are optional.

The present invention is by no means restricted to the embodiments described by way of example and represented in the drawing; on the contrary, such a method for regulating a transmission unit, as well as such a transmission unit applying this method, may be made according to several variants while still remaining within the scope of the invention.

We claim:

1. A method for regulating a transmission unit for motor vehicles that includes a belt variator, a reversing unit and a hydraulically controlled engine drive coupling unit including a forward coupling and a reverse coupling, the engine drive coupling unit including at least one fluid pressure actuated clutch for actuating the reversing unit and being actuable via a pressure regulating unit by an adjustable clutch fluid pressure, comprising the step of:

hydraulically regulating the clutch actuating pressure as a function of both an engine Pitot pressure responsive to engine speed and a separate regulated pressure which is controlled by an electronically controlled valve; and hydraulically adjusting the regulated pressure set by the electronically controlled valve as a function of at least one Pitot pressure selected from the group consisting of the engine Pitot pressure and a primary Pitot pressure responsive to variator input shaft speed.

2. The method according to claim 1, including regulating the clutch pressure as a function of the engine Pitot pressure so that an increase of Pitot pressure or engine speed results in an increase of the clutch actuating pressure.

3. The method according to claim 1, further comprising the steps of:

maintaining the regulation of the clutch actuating pressure by the electronically controlled valve until the belt variator attains a predetermined speed ratio; and after the predetermined speed ratio has been reached, replacing the regulated clutch pressure with a constant pressure sufficient to ensure that the desired engine drive coupling is maintained engaged.

4. The method according to claim 1, wherein a primary Pitot pressure responsive to variator input shaft speed is provided and the clutch actuating pressure is also regulated as a function of the primary Pitot pressure.

5. The method according to claim 4, including regulating the clutch actuating pressure as a function of the primary Pitot pressure so that an increase of the primary Pitot pressure results in a decrease of the clutch actuating pressure.

6. The method according to claim 1, wherein the adjustment of the regulated pressure set by the electronically controlled valve is selectively executed as a function of the engine Pitot pressure and as a function of the primary Pitot pressure.

7. The method according to claim 1, wherein an increase of the engine Pitot pressure results in an increase of the regulated pressure set by the electronically controlled valve when the engine Pitot pressure is selected and an increase of the primary Pitot pressure results in a decrease of the regulated pressure set by the electronically controlled valve when the primary Pitot pressure is selected.

8. The method according to claim 7, wherein the adjustment of the regulated pressure set by the electronically controlled valve is executed as a function of the engine Pitot pressure and as a function of the primary Pitot pressure.

9. The method according to claim 1, wherein the adjustment of the regulated pressure set by the electronically controlled valve is executed by adjusting a supply pressure of the electronically controlled valve as a function of at least one Pitot pressure selected from the group consisting of the engine Pitot pressure and a primary Pitot pressure responsive to variator input shaft speed.

10. A transmission unit, comprising:

a belt variator;

a hydraulically controlled engine drive coupling unit including a reversing unit, and a forward coupling and a reverse coupling for actuating the reversing unit;

said forward and reverse couplings comprising fluid actuated clutches, and a pressure regulating unit which regulates the actuating pressure of said clutches with an adjustable clutch fluid actuating pressure;

an electronically controlled valve arranged to supply a variable pressure to said pressure regulating unit for regulating said clutch fluid actuating pressure;

an engine Pitot unit responsive to engine speed arranged to supply an engine Pitot pressure to said pressure regulating unit for regulating said clutch fluid actuating pressure, wherein said engine Pitot pressure is arranged such that a decrease of said engine Pitot pressure reflects a decrease in engine speed and results in a decrease of said clutch actuating pressure; and a feed valve;

wherein said electronically controlled valve is supplied hydraulically in one direction by said feed valve, said feed valve including a feed valve piston loaded in one direction by a feed valve spring and said engine Pitot pressure and being loaded in an opposing direction by a pressure supplied by said feed valve and said primary Pitot pressure.

11. A transmission unit according to claim 10, wherein said pressure regulating unit comprises a pressure regulating valve including a regulating valve spool piston and a regulating valve chamber cooperating with the spool piston connected to a primary Pitot unit, said primary Pitot unit supplying a pressure to said regulating valve chamber to exert a force on said regulating valve piston opposite to a force exerted on said regulating valve piston by said engine Pitot pressure.

12. A transmission unit according to claim 10, wherein said electronically controlled valve comprises a pulse-modulated passage valve.

13. A transmission unit according to claim 10, further comprising:

a connection valve connecting said electronically controlled valve to said pressure regulating unit, said connection valve fluidically connected to said electronically controlled valve and said pressure regulating unit so as to ensure that regulation of the pressure regulating unit by said electronically controlled valve is maintained until said belt variator attains a predetermined transmission speed ratio and is replaced by a constant fluid pressure when said predetermined transmission speed ratio is attained, said constant pressure being sufficient to maintain the desired clutch coupling engaged.

14. A transmission unit according to claim 13, wherein said belt variator comprises a primary pulley having at least one axially movable primary pulley half, a secondary pulley having at least one axially movable secondary pulley half, and an endless transmission element between said pulleys; a movable feeler unit movable in response to primary pulley half motion; and wherein said connection valve is connected to said feeler unit and controlled by motion thereof.

15. A transmission unit according to claim 14, further comprising:

a primary regulating valve which controls axial movement of said primary pulley half; and a secondary regulating valve which controls axial movement of said secondary pulley half, wherein said connection valve is part of said secondary regulating valve.

16. A transmission unit according to claim 10, wherein said pressure regulating unit comprises a pressure regulating valve which is connected to said couplings via a switch valve, said pressure regulating valve having a regulating valve spool loaded by a regulating valve spring and said clutch fluid actuating pressure in the same direction;

said connection of said engine Pitot unit to said pressure regulating unit comprises a plurality of loading conduits, one of which opens into a loading chamber in said regulating valve such that a pressure opposite to said regulating valve spring is exerted on said regulating valve spool; and said electronically controlled valve includes an outlet connected to said loading chamber to provide a pressure opposite to said regulating valve spring exerted on said regulating valve spool.

17. A transmission unit according to claim 16, further comprising:

a connection valve connecting an outlet of said electronically controlled valve to said pressure regulating unit, said connection valve fluidically connected to said electronically controlled valve and said pressure regulating unit such that regulation of the pressure regulating unit by said electronically controlled valve is maintained until said belt variator attains a predetermined transmission speed ratio and is replaced by a constant fluid pressure when said predetermined transmission speed ratio is attained, said constant pressure being sufficient to maintain the desired clutch coupling engaged.

18. A transmission unit according to claim 17, wherein said belt variator comprises a primary pulley having at least one axially movable primary pulley half, a secondary pulley having at least one axially movable secondary pulley half, and an endless transmission element between said pulleys and a movable feeler unit movable in response to motion of said primary pulley half connected to said connection valve to regulate operation of said connection valve.

19. A transmission unit according to claim 18, further comprising:

a primary regulating valve fluidically connected to said primary pulley half for controlling operation of said primary pulley half; and a secondary regulating valve fluidically connected to said secondary pulley half for controlling operation of said secondary pulley half; said connection valve constituting part of said secondary regulating valve.

* * * * *